United States Patent [19]

Cuba et al.

[11] Patent Number: 4,627,163

[45] Date of Patent: Dec. 9, 1986

[54] TUBE CUTTER FOR CUTTING TWO CONCENTRIC TUBES BULGED TOGETHER

[75] Inventors: Gary W. Cuba, Hopkins; Edward N. Laughlin, Columbia, both of S.C.

[73] Assignee: Westinghouse Electric Corp., Pittsburgh, Pa.

[21] Appl. No.: 632,978

[22] Filed: Jul. 20, 1984

[51] Int. Cl.$^4$ ............................................. B23D 21/06
[52] U.S. Cl. ........................................................ 30/95
[58] Field of Search ..................................... 30/95–101; 82/4 C, 70.1

[56] References Cited

U.S. PATENT DOCUMENTS

| 1,394,781 | 10/1921 | Nommeman | 30/98 |
| 3,731,381 | 5/1973 | Penfield et al. | 30/97 X |
| 3,798,765 | 3/1974 | Mattisson | 30/96 |

FOREIGN PATENT DOCUMENTS 2508868  9/1975  Fed. Rep. of Germany ....... 82/4 C

Primary Examiner—Douglas D. Watts

[57] ABSTRACT

An improved tube cutter is provided for cutting off a tube section formed by two concentric tubes mechanically bulged together wherein the cut to be made is adjacent the bulged area. The tube cutter includes an elongated housing formed by two matable portions having longitudinal matching recesses which define an axial bore through the housing and transverse matching recesses which define a circumferential groove that accommodates the bulged area when the housing portions are clamped together about the tube section. Each of the housing portions carry a cutter bit which is located adjacent the groove and is extendable into the axial bore as the tube cutter manually rotated about the tube section so as to make a cut through the tube section adjacent the bulged area.

9 Claims, 5 Drawing Figures

TUBE CUTTER FOR CUTTING TWO CONCENTRIC TUBES BULGED TOGETHER

BACKGROUND OF THE INVENTION

The present invention relates generally to tube cutters and, more particularly, is directed to an improved tube cutter for cutting off a tube section having a circumferential bulge, such as, a composite tube section formed by two concentric tubes which have been mechanically joined together by circumferential bulging as is a common practice in the nuclear reactor industry in constructing a basic fuel assembly structure.

As shown in U.S. Pat. No. 3,791,466, the basic fuel assembly structure for a nuclear reactor comprises a skeleton assembly made up of longitudinally extending hollow tubes or thimbles composed of zirconium base alloy, such as Zircaloy, and held in place by Inconel or stainless steel transversely extending grids disposed between stainless steel end nozzles at the top and bottom of the structure. The tubes serve as guide thimbles for cylindrical control elements strategically located in a square array of fuel rods held in place by spring fingers on the "egg-crate" grids. The guide thimbles are attached to the top and bottom nozzles and the grids are axially spaced along the guide thimbles and mechanically attached thereto by bulge expanding a sleeve, which is welded to the grid, onto the guide thimble.

By virtue of their zircalloy strap design, these grid assemblies contain inherently high material costs and therefore it is economically desirable to salvage them rather than to let them become nonfunctional scrap. However, due to the specific design and construction of these assemblies, salvage is constrained by several problems, namely: the grids are permanently affixed to the skeleton structural (thimble) tubes by mechanical bulges (deformations) between the sleeves, which are welded to the grids, and the thimbles; the bulges are located very close to the grid strap plane, which is perpendicular to the assembly axis and limits normal access; clearances are severely limited by thimble-to-thimble centerline spacings which are typically less than three-fourth inch between neighboring thimble outside diameter surfaces; and the grids must be protected from vibration, shock, and other forces which could have a deleterious effect on their structural integrity.

There are several tube cut-off tools on the market, such as the ones identified in U.S. Pat. Nos. 554,028; 1,857,493; 2,448,578; 2,571,916; 2,937,440; 2,983,043; and 3,608,194; however, none of these prior art cutters, for one reason or another, are capable of performing the tube cutting needs as set forth above. Thus, the need exists for a new tube cutter for cutting a tube section formed by a pair of concentric tubes joined together by a mechanical bulge wherein diametrical clearances and access are severely limited.

SUMMARY OF THE INVENTION

The present invention provides an improved tube cutter to satisfy the aforementioned needs which can be used in applications where diametrical clearances and access are severely limited, such as in nuclear reactor salvage operations wherein grids are reclaimed from skeleton fuel assemblies. The improved tube cutter enables a cut to be made through the tube section adjacent the bulge portion that joins the two concentric tubes together while protecting the grids from vibration, shock, and other forces which could have a deleterious effect on their structural integrity.

Accordingly, the present invention sets forth a cutter mechanism for making a cut through a tube section having a circumferential bulge wherein the cut is to be made adjacent the bulge, the cutter mechanism comprises: (a) an elongated housing being formed by at least two matable portions having first longitudinal matching recesses which define an axial bore through the housing when the portions are mated together and having second transverse matching recesses which define a circumferential groove when the portions are mated together; (b) means for clamping the portions together in a mating relationship which form the housing after the portions are assembled on the tube section such that the tube section extends through the axial bore and the bulge is contained within the circumferential groove; and (c) cutting means mounted to the housing and extendable into the bore to make the circumferential cut upon rotation of the housing relative to the tube section.

In the preferred embodiment, the cutter mechanism further includes means in the form of at least one bore extending through each portion of the housing which bore is adapted to receive one end of a lever whereby an operator can manually rotate the housing about the tube section for thereby controlling the forces applied.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
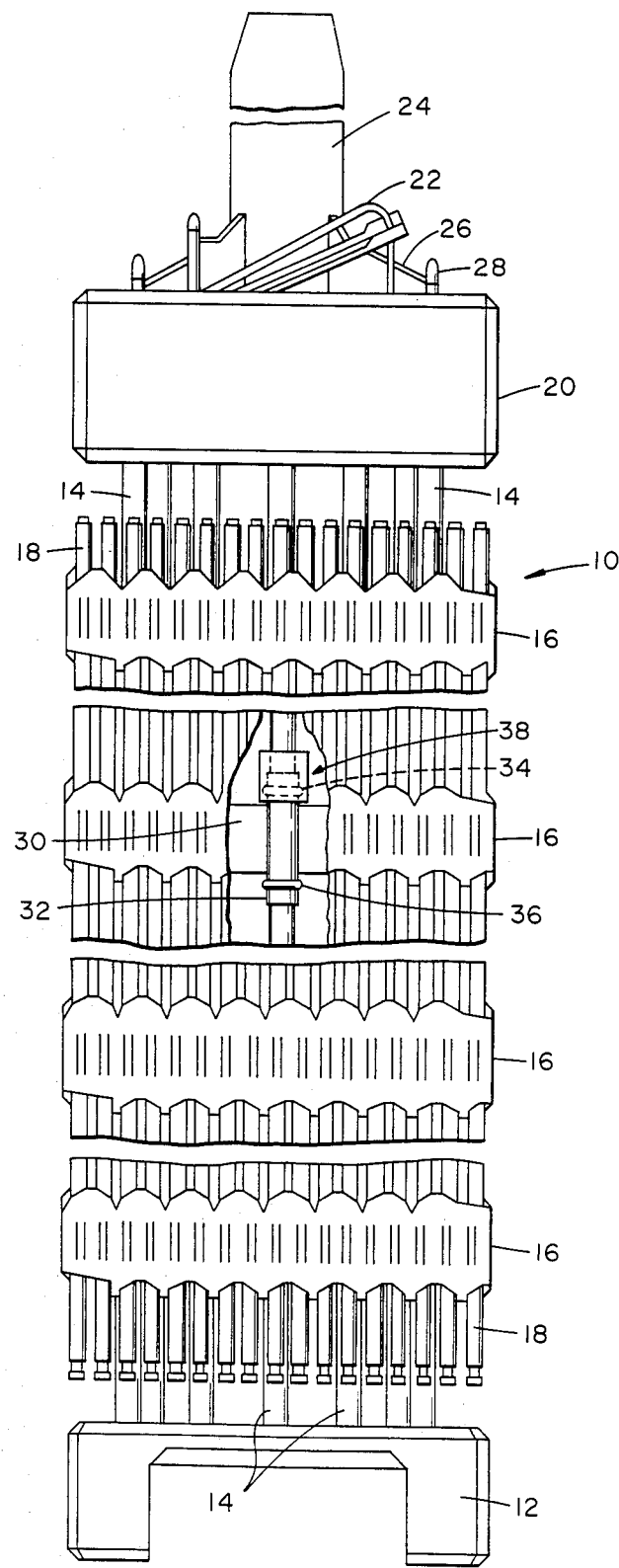
FIG. 1 is a schematic illustration of the cutter mechanism of the present invention as used on a conventional nuclear reactor fuel assembly being shown in a vertically foreshortened, elevational view with parts broken away to more clearly show the disposition of the cutter mechanism.

In the following description, like reference characters designate like or corresponding parts throughout the several views. Also, in the following description, it is to be understood that such terms as "forward", "rearward", "left", "right", "upwardly", "downwardly", and the like, are words of convenience and not to be construed as limiting terms.

IN GENERAL

Referring now to the drawings, and particularly to FIG. 1, there is shown an elevational view of a conventional fuel assembly, represented in vertically foreshortened form and being generally designated by the numeral 10. Fuel assembly 10 is of the type used in a PWR (Pressurized Water Reactor) and basically comprises a lower end structure or bottom nozzle 12 for supporting the assembly on the lower core plate (not shown) in the core region of a reactor (not shown); a number of longitudinally extending guide tubes or thimbles 14 projecting upwardly from the bottom nozzle 12; a plurality of transverse grids 16 axially spaced along the guide thimbles 14; an organized array of elongated fuel rods 18 transversely spaced and supported by the grids 16; and an upper end structure or top nozzle 20 attached to the upper ends of the guide thimbles 14 to form an integral assembly capable of being conventionally handled without damaging the assembly components. The top nozzle 20 is formed of a transversely extending adapter plate having upstanding sidewalls secured to the peripheral edges thereof in defining an enclosure or housing having an upper annular flange to which leaf springs 22 (only one of which is shown in FIG. 1) are suitably clamped. The leaf springs 22 cooperate with the upper core plate (not shown) in a conventional manner to prevent hydraulic lifting of the fuel assembly 10 caused by upward coolant flow while allowing for changes in fuel assembly length due to core induced thermal expansion and the like. Disposed within the opening defined by the sidewalls of the top nozzle 22 is a conventional rod cluster control assembly 24 having radially extending flukes 26 being connected to the upper ends of the control rods 28 for vertically moving the control rods in the guide thimbles 14 in a well known manner.

To form the fuel assembly 10, the transverse grids 16 are attached to the longitudinally extending guide thimbles at predetermined axially spaced locations; the fuel rods 18 are inserted through the grids 16; the lower nozzle 12 is suitably attached to the lower ends of the guide thimbles 14; and then the top nozzle 20 is attached to the upper ends of the guide thimbles 14. The grids 16 are formed of interleaved straps 30 (only one of which is shown) arranged in an egg-crate configuration defining individual cells through which the fuel rods 18 pass. In the specific fuel assembly 10 illustrated, the grids 16 are attached to the guide thimbles 14 by short sleeves 32 which are mounted in a grid cell and inserted over a guide thimble and attached thereto by respective upper and lower conventional expansion bulges 34,36 which mechanically join the sleeves 32 and therewith the grid 16 on the guide thimbles 14. As known by those skilled in the art, such attaching or fastening technique is customary in joining two dissimilar materials together and is widely used in the construction of fuel assemblies.

As explained earlier, it's economically desirable to dissassemble a dysfuntional fuel assembly and salvage some of its expensive components, such as the grid structures 16. However, as can be appreciated, due to the diametrical clearances between the guide thimbles 14 and the vertical space between grids 16, access to the mechanical bulge joints 34,36 is severely limited in thus making it practically impossible to disassemble a fuel assembly, yet alone, to carry out a disassembling operation without damaging the structural integrity of the grids 16 which would preclude later reuse. However, with the introduction of the improved cutter mechanism or tube cutter which is the subject of the present invention, being generally indicated by the numeral 38 and schematically represented in its operative mode in FIG. 1, the fuel assembly can now be disassembled and the grids reclaimed for future use.

Before describing the improved tube cutter 38 in detail, it should be pointed out that the tube cutter has been shown in the environment of fuel assembly 10 merely to represent a typical use or application thereof, however, its use is not so limited, but rather is applicable to the cutting or severing of a tube section having a circumferential bulge portion, such as, a composite tube section wherein a first tube (guide thimble 14) is inserted into a second tube (sleeve 32) and the tubes (14,32) are interfitted together by producing a concentric circumferential bulge or bulges (bulges 34,36) and wherein the tube section is to be cutoff adjacent the bulged portion.

IMPROVED TUBE CUTTER

Figure 2:
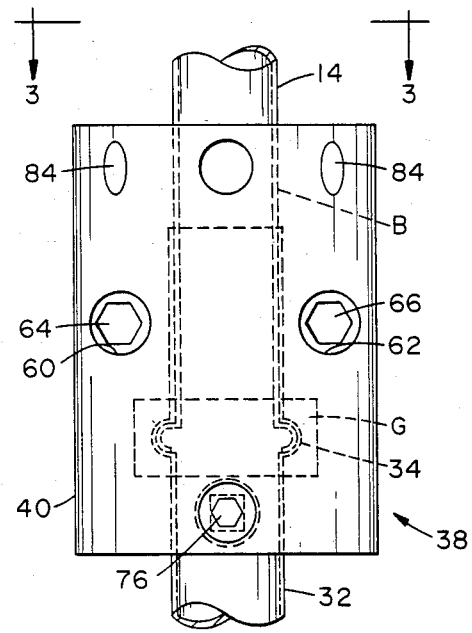
FIG. 2 is an elevational view of the cutter mechanism seen in FIG. 1, removed from the fuel assembly and being assemblied in its operative mode on a composite tube section.

Now, while referring to FIGS. 2 thru 5, and particularly FIG. 2, the improved tube cutter 38, formed in accordance with the principles of the present invention, will now be discussed in further detail. In FIG. 2, the tube cutter 38 is shown in its operative mode being assembled on a composite tube section which is represented by the guide thimble 14 (inner tube) inserted into the sleeve 32 (outer tube) with the guide thimble 14 and sleeve 32 being mechanically joined together by the concentric circumferential bulge 34. For clarity and simplicity, the composite tube section will be referred to by the number 14,32 hereinafter.

Figure 3:
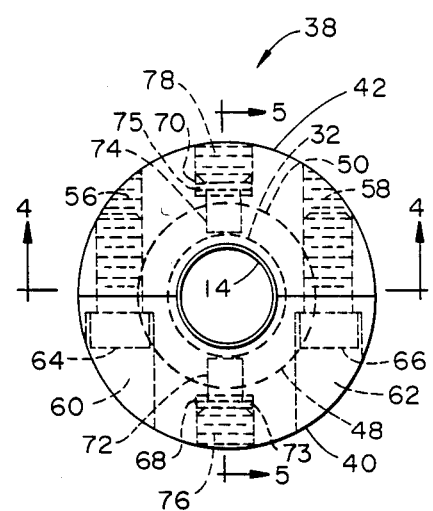
FIG. 3, is a top plan view of the cutter mechanism as seen along line 3—3 of FIG. 2.

As best seen in FIG. 2 and 3, the tube cutter 38 is comprised of an elongated housing, preferably formed of two halves or matable portions 40,42 having respective longitudinal matching recesses 44,46 which define an axial bore (hereinafter referred to by the letter "B") through the housing when the portions 40,42 are mated together. In the preferred embodiment, matable portion 40,42 are substantially identical, being of hardenable stainless steel and semicylindrical in shape such that when they are joined together they form a cylindrical housing. It should be noted in the drawings that in FIG. 2, only matable portion 40 can be seen; in FIG. 3, matable portion 40 is seen in the lower half of the drawing whereas matable portion 42 is seen in the upper half of the drawing; in FIG. 4, only matable portion 42 is seen; and in FIG. 5, that part to the left of the vertical line is the matable portion 42 whereas on the right side is matable portion 40.

Figure 4:
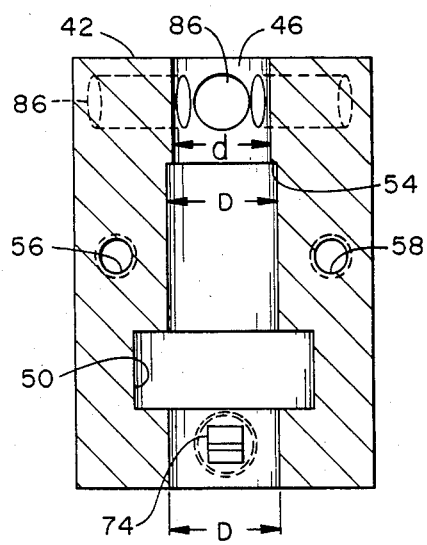
FIG. 4 is a sectional view, as taken along line 4—4 of FIG. 3, of the cutter mechanism being disassembled from the composite tube section.
Figure 5:
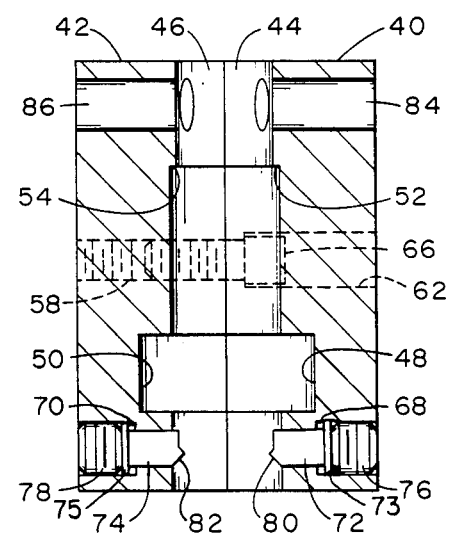
FIG. 5 is a sectional view, as taken along line 5—5 of FIG. 3, of the cutter mechanism removed from the composite tube section and showing both housing portions and the cutter bits that are extendable into the axial bore.

As best seen in FIG. 5, housing portions 40,42 each have a transverse matching recess 48,50 respectively which define a circumferential groove (hereinafter referred to by the letter "G") when the portions are mated together. The purpose of the groove G is to accomodate for the bulge 34 when the housing portions 40,42 are assembled on the composite tube section 14,32. As seen in FIGS. 2, 4 and 5, each of the recesses 48,50 are rectangular shaped in profile, however, they may be curved such that the circumferential groove G is similar in shape to that of the bulge 34.

Additionally, as seen in FIG. 4, the axial bore B through the housing 40,42 formed by the longitudinal recesses 44,46 is stepped or offset such that the axial bore B has an upper smaller diameter "d" segment and a lower larger diameter "D" segment. The intersection of the upper smaller diameter "d" segment with the lower larger diameter "D" segment forms a lip 52 in housing portion 40 and a lip 54 in housing portion 42 which together define an annular lip 52,54 when the two housing half portions 40,42 are mated together. The lower, larger diameter "D" segment encircles the outer tube, or sleeve 32, whereas, the upper, smaller "d" diameter segment, encircles the inner tube, or guide thimble 14. The annular lip 52,54 abuts against the terminal end of the sleeve 32 so as to axially align and retain the tool 38 on the composite tube section 14,32 when the housing portions 40,42 are clamped together, thus maintaining cutter-to-sleeve relative geometry and reducing unusual forces on the grid 16 during the cutting operation.

For joining the two housing portions 40,42 together, clamping means are provided in the form of: respective left and right internally threaded holes 56,58 defined in the one housing portion 42; respective left and right thru-holes 60,62 defined in the other housing portion 40; and respective left and right externally threaded fasteners 64,66. Fasteners 64,66 are adapted to extend through the thru-holes 60,62 and threadably engage corresponding ones of the internally threaded holes 56,58 so as to clamp the mating housing portions 40,42 about the composite tube section 14,32 as best seen in FIG. 3. In such clamped, operating mode position, the composite tube section 14,32 extends through the axial bore B with the "D" diameter segment closely fitting about the sleeve 32, the "d" diameter segment closely fitting about the thimble 14, the annular lip 52,54 abutting the terminal end of sleeve 32, and with the bulge 34 being contained within the circumferential groove G. The threaded holes 56,58 are located on opposite sides of the longitudinal recess 46 of housing portion 42 and disposed approximately midway between its axial height (see FIG. 4), whereas, the thru-holes 60,62 are located on opposite sides of the longitudinal recess 44 of housing portion 40 and disposed approximately midway between its axial height (see FIGS. 2 and 3).

As best seen in FIG. 5, spaced below the circumferential groove G and located centrally of each housing portion are respective internally threaded and broached holes 68,70 defined in housing portions 40,42. The broached holes 68,70 carry corresponding cutter bits 72,74 which are radially extendable into the axial bore B by rotation of corresponding set screws 76,78. Clockwise rotation of screws 76,78 advance the cutter bits 72,74 into the composite tube section 14,32 (workpiece) in a well known manner. Preferably, tool 38 utilizes two cutter bits 72,74 for increased cutting efficiency; however, only one such cutter bit is necessary to make the desired cut. Preferably, the cutter bits 72,74 are of hardened steel and have respective shoulders 73,75 (see FIG. 5) formed on one end such that the cutter bits 72,74 will not fall through the broached holes 68,70 when the cutter halves are engaged and disengaged from the workpiece. The other end of each cutter bit 72,74 is specially ground to simulate the general configuration of standard tube cutting wheels, ie., a simple V-shaped configuration, having projecting cutting edges 80,82 respectively.

In the preferred embodiment, the tube cutter 38 is operated manually so as to prevent uncontrolled and excessive loading on the grid 16 during the cutting operation. To facilitate manual rotation of the tube cutter 38 about the composite tube section 14,32 for making the cut, at least one, and preferably a plurality of radially spaced bores 84 and 86, are defined in the respective housing portions 40,42. Bores 84,86 are adapted to receive one end of a torque lever or extension bar (not shown) to assist the operator in manually rotating the tube cutter 38 about the tube section 14,32. As clearly seen in FIGS. 2, 4 and 5, bores 84,86 are located in the upper end portion or "d" diameter segment portion of housing 40,42; whereas, the cutter bits 72,74 are located on the opposite lower end portion or "D" diameter segment portion of housing 40,42.

As can be appreciated from the above description of the improved tube cutter 38 of the present invention, the design thereof is such that it can be used in applications where diametrical clearances and access are severely limited, such as in the disassembling and salvaging operation of fuel assembly 10. The split feature allows it to be clamped together over continuous tubes, such as guide thimbles 14. Further, the provision of the circumferential groove G which accomodates or contains the bulge area 34, and the specific location of the cutter bits 72,74, relative to the groove G, enables the tube cutter 38 to be positioned close to the grid strap 30 whereby the resulting cut through the composite tube section 14,32 can be made in the closely spaced area and adjacent the bulge 34.

It is thought that the invention and many of its attendant advantages will be understood from the foregoing description and it will be apparent that various changes may be made in form, construction and arrangement of the improved tube cutter without departing from the spirit and scope of the invention or sacrificing all of its material advantages, the form hereinbefore described being merely a preferred or exemplary embodiment thereof.

We claim:

1. A cutter mechanism for making a cut through a tube section having a circumferential bulge wherein said cut is to be made adjacent said bulge, said cutter mechanism comprising:
  (a) an elongated housing being formed by at least two matable portions having first longitudinal matching recesses which define an axial bore through said housing having a first diameter extending from one end of said housing and a second diameter larger than the first diameter extending from the opposite end of said housing when said portions are mated together and having second transverse matching recesses which define a circumferential groove when said portions are mated together;
  (b) means for clamping said portions together in a mating relationship which form said housing after said portions are assembled on said tube section such that said tube section extends through said axial bore and said bulge is contained within said circumferential groove;
  (c) means defining a radial bore in at least one of said portions of said housing at one axial end portion of said housing between said circumferential groove and one terminal end of said housing, said radial bore extending radially from said axial bore of said housing;
  (d) cutting means including at least one cutter bit being mounted in said radial bore of said housing and positioned adjacent the outer surface of said tube section when said housing is assembled on said tube section, said cutter bit being extendable into said axial bore to make a circumferential cut in said tube section upon rotation of said housing relative to said tube section; and (e) means on said housing to facilitate rotation of said housing about said tube section for applying said cut, said means to facilitate rotation being located on an opposite axial end portion of said housing defined between said circumferential groove and the other terminal end of said housing.

2. The cutter mechanism as defined in claim 1, wherein said means to facilitate rotation includes at least one bore extending through each portion of said housing at said opposite axial end portion thereof, said bore being adapted to receive one end of a lever whereby an operator can manually rotate said housing.

3. The cutter mechanism as described in claim 1, wherein said clamping means includes:

a pair of transversely spaced internally threaded holes defined in one of said housing portions, one of said threaded holes being located on one side and the other one of said threaded holes being located on the opposite side of said longitudinal recess provided in said housing portion;

a corresponding pair of transversely spaced apertures defined in the other one of said housing portions, each apertures being axially aligned with a respective threaded hole when said portions are assembled on said tube section; and a pair of externally threaded fasteners, each fastener adapted to extend through one of said apertures and threadably engageable with the corresponding threaded hole so as to clamp said mating portions together to form said housing.

4. The cutter mechanism as defined in claim 1, wherein a cutter bit is so mounted on each portion of said housing.

5. The cutter mechanism as defined in claim 4, wherein said cutter bit associated with said one housing portion is located diametrically opposite said cutter bit associated with said other housing portion when said housing is assembled on said tube section.

6. The cutter mechanism as defined in claim 1, wherein said cutting means further includes means for adjusting the radial movement of said cutter bit whereby said cutter bit can be extended further into said bore so as to perform said cut upon rotation of said housing.

7. The cutter mechanism as defined in claim 1, wherein said tube section is a composite tube section formed by a first tube inserted into a second tube with said tubes being interfitted together by producing a concentric circumferential bulge in said tubes whereby said cut is to be made adjacent said bulge.

8. The cutter mechanism as defined in claim 7, wherein the longitudinal recess of each housing portion is stepped such when said portions are mated together said axial bore has a large diameter segment and a small diameter segment, said large diameter segment encircling said second tube and said small diameter segment encircling said first tube of said composite tube section.

9. The cutter mechanism as defined in claim 8, wherein said circumferential groove for containing said bulge is located within the large diameter segment of said axial bore.

* * * * *